United States Patent
Lee

(10) Patent No.: US 7,334,121 B2
(45) Date of Patent: Feb. 19, 2008

(54) FLASH MEMORY SYSTEM INCLUDING A DUPLICATE BOOTING PROGRAM AND APPARATUS AND METHOD FOR PROTECTING THE SAME FLASH MEMORY

(75) Inventor: Ki-Ju Lee, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 423 days.

(21) Appl. No.: 10/720,078

(22) Filed: Nov. 25, 2003

(65) Prior Publication Data
US 2004/0153846 A1 Aug. 5, 2004

(30) Foreign Application Priority Data
Dec. 2, 2002 (KR) ............. 10-2002-0076037

(51) Int. Cl.
*G06F 9/00* (2006.01)
(52) U.S. Cl. ............... 713/2; 713/1; 713/100; 714/1; 714/48
(58) Field of Classification Search ............ 713/1, 713/2, 100; 714/1, 48
See application file for complete search history.

(56) References Cited

U.S. PATENT DOCUMENTS

| | | | | |
|---|---|---|---|---|
| 4,996,687 A | * | 2/1991 | Hess et al. | 714/15 |
| 5,268,962 A | * | 12/1993 | Abadi et al. | 713/161 |
| 5,388,267 A | * | 2/1995 | Chan et al. | 713/2 |
| 5,793,943 A | * | 8/1998 | Noll | 714/6 |
| 6,079,016 A | * | 6/2000 | Park | 713/2 |
| 6,205,547 B1 | * | 3/2001 | Davis | 713/1 |
| 6,289,449 B1 | | 9/2001 | Aguilar et al. | |
| 6,412,082 B1 | * | 6/2002 | Matsuura | 714/38 |
| 6,421,792 B1 | * | 7/2002 | Cromer et al. | 714/36 |
| 6,539,474 B2 | * | 3/2003 | Matsuura | 713/2 |
| 6,757,838 B1 | * | 6/2004 | Chaiken et al. | 714/5 |
| 6,778,491 B1 | * | 8/2004 | Fourcand et al. | 370/217 |
| 6,892,323 B2 | * | 5/2005 | Lin | 714/36 |
| 2003/0005277 A1 | * | 1/2003 | Harding et al. | 713/2 |
| 2003/0070115 A1 | * | 4/2003 | Nguyen et al. | 714/23 |

FOREIGN PATENT DOCUMENTS

| | | |
|---|---|---|
| JP | 11-316687 | 11/1999 |
| JP | 2001-109629 | 4/2001 |
| KR | 2001-9991 | 2/2001 |

OTHER PUBLICATIONS

Korean Office Action for Application No. 10-2002-0076037.

* cited by examiner

*Primary Examiner*—Thomas Lee
*Assistant Examiner*—Malcom D Cribbs
(74) *Attorney, Agent, or Firm*—Staas & Halsey LLP

(57) ABSTRACT

A flash memory that shares a booting function and a booting program, and an apparatus and method for protecting the same in an AT Attachment Packet Interface (ATAPI) drive. The flash memory includes a first boot zone, where a booting program is stored, a second boot zone, where a backup of the booting program is stored, and a data zone, where an executable and downloaded firmware program is stored, wherein the corresponding booting program in either of the first or second boot zones which has no error is executed when an error is detected in the alternate first or second boot zone. Accordingly, it is possible to restore a flash memory damaged due to some external cause to its original state, thereby reducing costs for replacement of the damaged flash memory.

39 Claims, 4 Drawing Sheets

FLASH MEMORY SYSTEM INCLUDING A DUPLICATE BOOTING PROGRAM AND APPARATUS AND METHOD FOR PROTECTING THE SAME FLASH MEMORY

CROSS-REFERENCE TO RELATED APPLICATIONS

This application claims the priority of Korean Patent Application No. 2002-76037, filed on Dec. 2, 2002, in the Korean Intellectual Property Office, the disclosure of which is incorporated herein in its entirety by reference.

BACKGROUND OF THE INVENTION

1. Field of the Invention

The present invention relates to a flash memory that includes a booting program, a duplicate booting program, and a firmware program, and an apparatus and method for protecting the same.

2. Description of the Related Art

A flash memory stores a firmware program, for an AT Attachment Packet Interface (ATAPI) drive, which is transmitted from a host. A firmware program previously stored in the flash memory may be updated with a new version of the firmware program. However, a boot area of the flash memory, in which a booting program is stored, may be damaged by some external cause. In this case, it is impossible to restore the damaged boot area to its original state, and thus, the flash memory becomes unavailable.

SUMMARY OF THE INVENTION

Aspects and/or advantages of embodiments of the present invention are accomplished by providing a flash memory having a boot zone in which a booting program is stored, and a data zone in which a firmware program is stored.

Additional aspects and/or advantages of embodiments of the present invention are accomplished by providing a flash memory protection apparatus capable of restoring a flash memory, damaged by some external cause, to its original state.

Additional aspects and/or advantages of embodiments of the present invention are accomplished by providing a flash memory protection method capable of restoring a flash memory, damaged by some external cause, to its original state.

Additional aspects and/or advantages of the invention will be set forth in part in the description which follows and, in part, will be obvious from the description, or may be learned by practice of the invention.

To achieve the above and/or other aspects and advantages, embodiments of the present application provide a flash memory, including a first boot zone storing a first booting program, a second boot zone storing a duplicate of the first booting program, as a second booting program, and a data zone storing an executable firmware program, wherein one of the first or second booting programs is executed based on whether an error is detected in either of the first or second boot zones.

To achieve the above and/or other aspects and advantages, further embodiments of the present application provide a memory protection apparatus, of an AT Attachment Packet Interface (ATAPI) drive for storing an executable firmware program, downloaded from a host, the apparatus including a storage unit having a first boot zone storing a first booting program, a second boot zone storing a duplicate of the first booting program, as a second booting program, and a data zone storing the firmware program, and a controller checking for a presence of an error in the first and/or second booting zones when the ATAPI drive is initialized, executing one of the first booting program or the second booting program based on whether the first or second boot zones include an error, and controlling execution of the firmware program.

To achieve the above and/or other aspects and advantages, another embodiment of the present application provides a method of operating an ATAPI drive for storing an executable firmware program downloaded from a host, the method including detecting for an error in a first boot zone of a memory, storing a first booting program, and a second boot zone of the memory, storing a duplicate of the first booting program, as a second booting program, when the ATAPI drive is initialized, executing one of the first or second booting programs based on whether the first boot zone or the second boot zone includes an error, and accessing the data zone of the memory in which the firmware program is stored and executing the firmware program after the executed one booting program.

To achieve the above and/or other aspects and advantages, another embodiment of the present application provides a flash memory, including a first memory having a first boot zone storing a first booting program and a second boot zone storing a duplicate of the first booting program, as a second booting program, and a second memory having a data zone storing an executable downloaded firmware program, wherein one of the first or second booting programs is executed based on an error being detected in the first boot zone or the second boot zone.

To achieve the above and/or other aspects and advantages, another embodiment of the present application provides a memory protection apparatus, including an ATAPI drive for storing an executable firmware program downloaded from a host, the apparatus including a first storage unit having a first boot zone storing a first booting program and a second boot zone storing a duplicate of the first booting program, as a second booting program, a second storage unit storing the firmware program, and a controller detecting for an error in one of the first or second boot zones when the ATAPI drive is initialized, executing the first booting program or the second booting program based on whether the one boot zone is the first boot zone or the second boot zone, and controlling execution of the firmware program stored in the data zone of the second storage unit.

To achieve the above and/or other aspects and advantages, another embodiment of the present application provides a method of operating an ATAPI drive, storing an executable firmware program downloaded from a host, the method including detecting for an error in first and second boot zones of a first storage unit when the ATAPI drive is initialized, the first boot zone storing a first booting program and the second boot zone storing a duplicate of the first booting program, as a second booting program, executing one of the first or second booting programs based on whether the corresponding first or second boot zone has no error, and accessing a data zone of a second storage unit, storing the firmware program, and executing the firmware program after the execution of the one booting program.

To achieve the above and/or other aspects and advantages, still another embodiment of the present application provides a storage system, including a first memory storing more than one booting program, a second memory storing a firmware program for the storage system, separately addressable from the first memory, and a controller checking for a presence of an error in a first memory portion, of the first memory, when a storage drive containing the first memory is initialized, executing a first booting program, stored in the first memory portion, if no error is detected in the first memory portion, and executing a different booting program stored in a different memory portion of the first memory, if the error is detected in the first memory portion, and executing the firmware program after executing a booting program.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
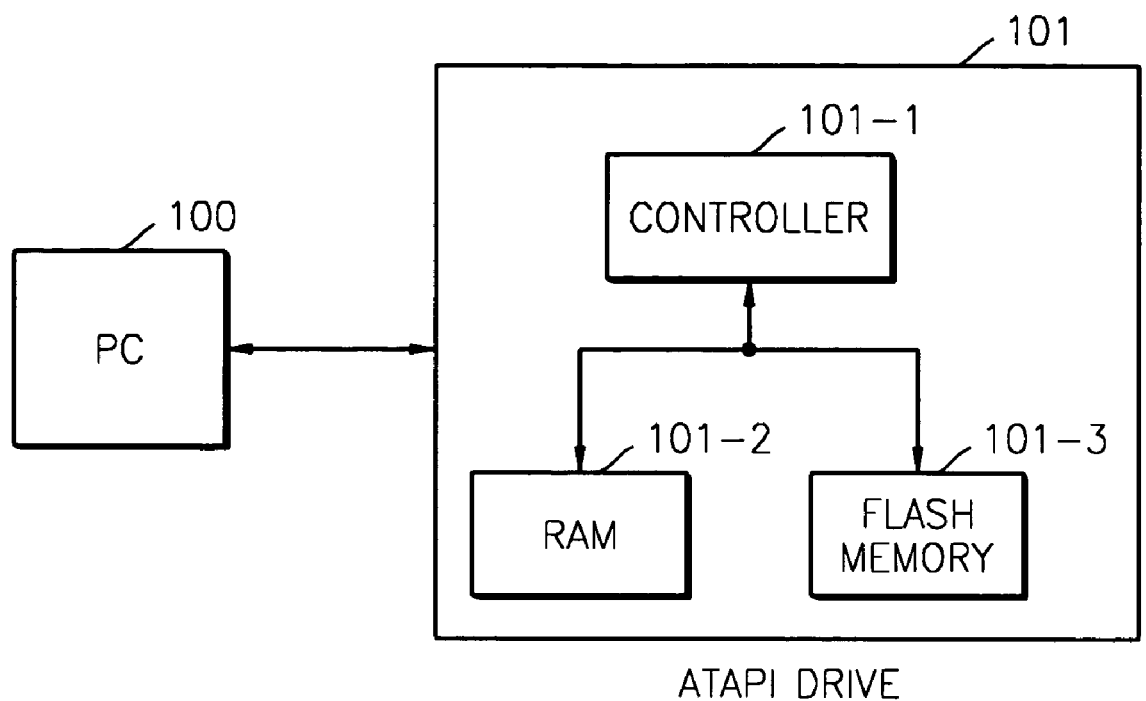
FIG. 1 is a block diagram illustrating the structure of a flash memory protection apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating the structure of a flash memory protection apparatus, according to an embodiment of the present invention. Referring to FIG. 1, the flash memory protection apparatus includes a personal computer (PC) 100 and an AT Attachment Packet Interface (ATAPI) drive 101. The ATAPI drive 101 includes a controller 101-1, a Random Access Memory (RAM) 101-2, and a flash memory 101-3.

Figure 2A:
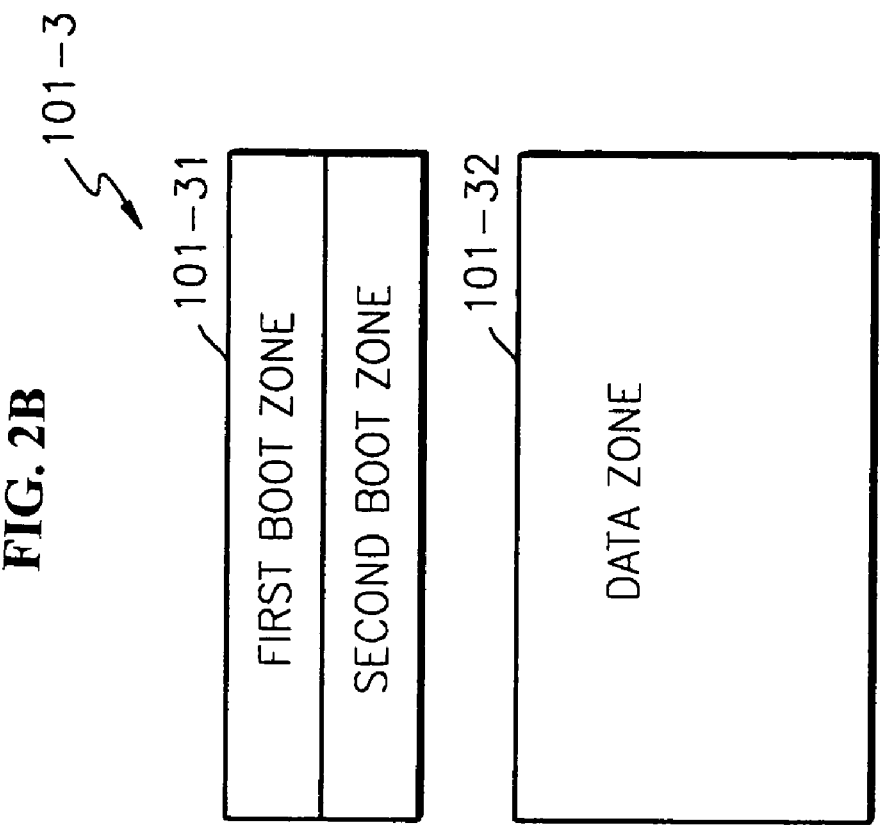
FIGS. 2A and 2B illustrate flash memory structures, according to additional embodiments of the present invention.
Figure 2B:
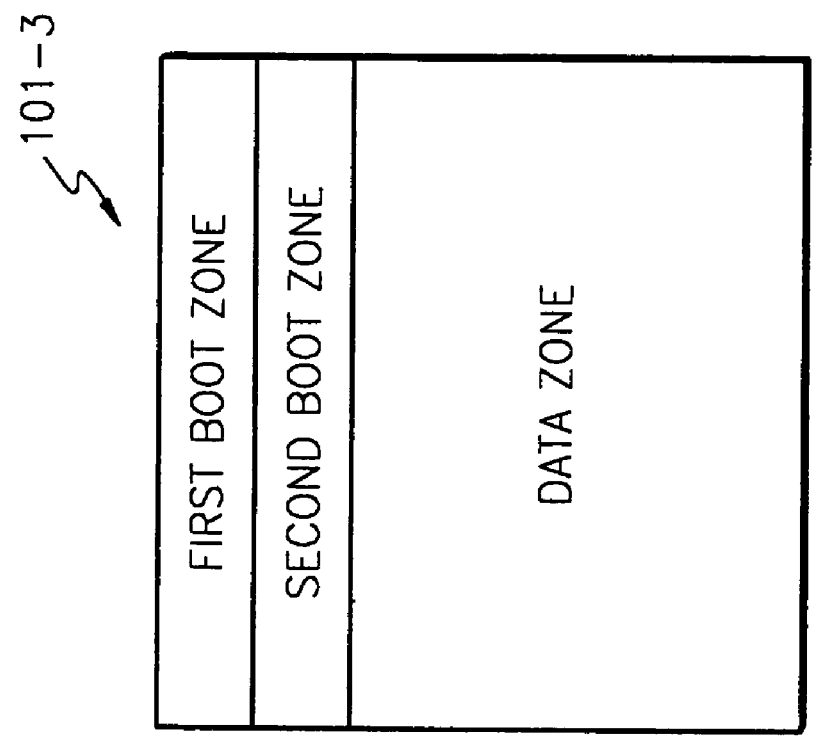

FIGS. 2A and 2B illustrate flash memory structures, according to additional embodiments of the present invention.

Figure 3:
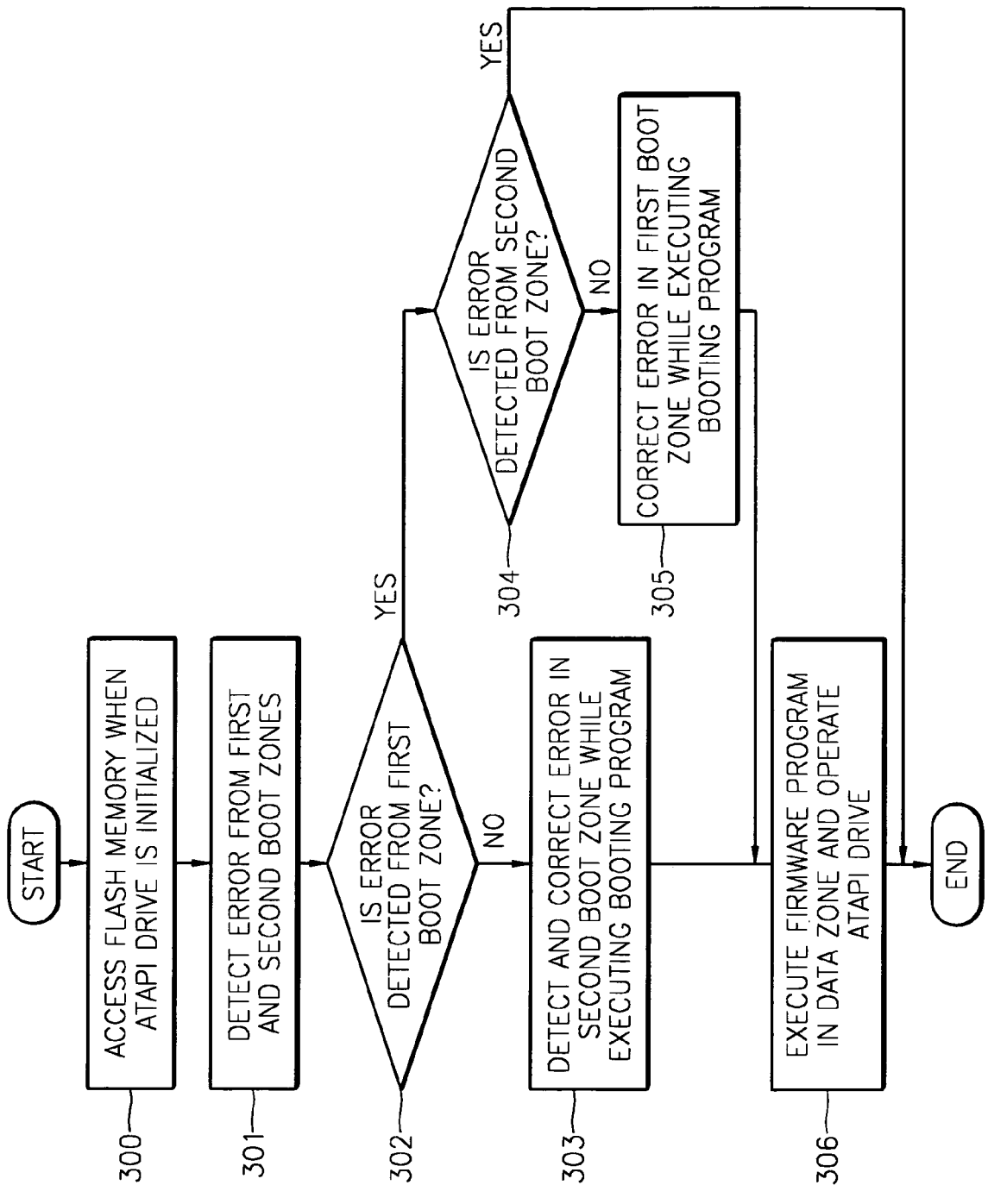
FIG. 3 is a flowchart illustrating a flash memory protection method, according to an embodiment of the present invention.

FIG. 3 is a flowchart illustrating a flash memory protection method, according to another embodiment of the present invention. Referring to FIG. 3, the method includes accessing a flash memory when an ATAPI drive is initialized (operation 300), detecting for an error in first and second boot zones of the flash memory (operation 301), determining whether an error is detected in the first boot zone (operation 302), detecting and correcting for an error in the second boot zone while executing a booting program in the first boot zone (operation 303) if no error is detected in the first boot zone, and alternatively determining whether an error is detected in the second boot zone (operation 304) and correcting the error in the first boot zone while executing the booting program in the second boot zone (operation 305) or ending the flash memory protection process, and executing a firmware program stored in a data zone and operating the ATAPI drive (operation 306) if the flash memory protection process is not ended.

Figure 4:
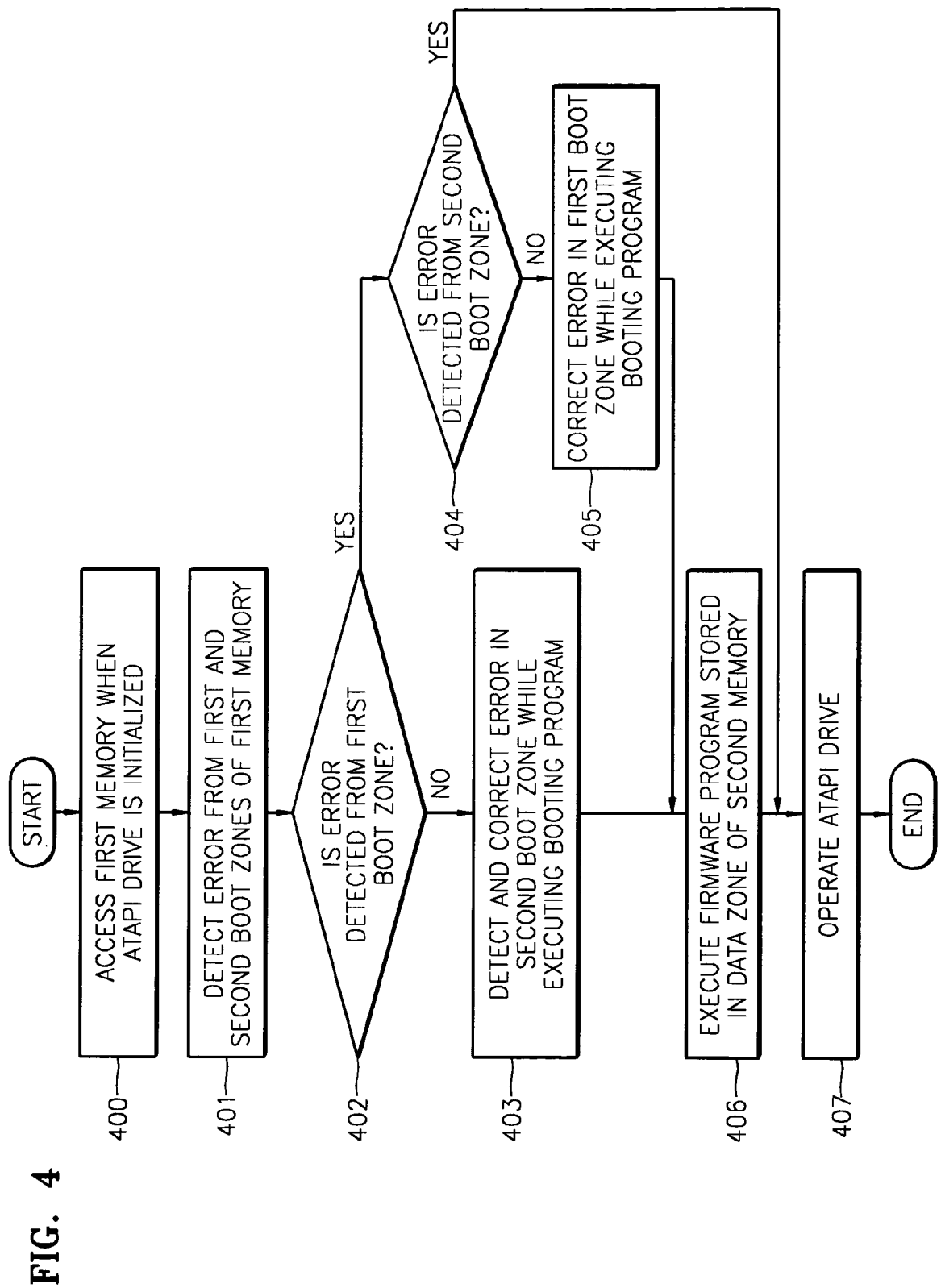
FIG. 4 is a flowchart illustrating a flash memory protection method, according to another embodiment of the present invention.

FIG. 4 is a flowchart illustrating a flash memory protection method, according to another embodiment of the present invention. Referring to FIG. 4, the method includes accessing a first memory when an ATAPI drive is initialized (operation 400), detecting for an error in first and second boot zones of the first memory (operation 401), determining whether an error is detected in the first boot zone (operation 402), detecting and correcting for an error in the second boot zone while executing a booting program in the first boot zone (operation 403) if no error is detected in the first boot zone, and alternatively determining whether an error is detected in the second boot zone (operation 404) and correcting for the detected error in the first boot zone while executing the booting program in the second boot zone (operation 405) or ending the flash memory protection method, and executing a firmware program stored in a second memory (operation 406) after either the detecting and correcting of an error in the second boot zone and executing the booting program in the first boot zone or detecting and correcting of an error in the first boot zone while executing the booting program in the second boot zone, and subsequently operating the ATAPI drive (operation 407) if the flash memory protection process is not ended.

Hereinafter, embodiments of the present invention will be explained in greater detail with reference to FIGS. 1 through 4.

Embodiments of the present invention will be described with respect to two different kinds of flash memories. In detail, flash memories according to embodiments the present invention are categorized as being a flash memory 101-3 with a boot zone and a data zone, with the flash memory 101-3 having a first memory 101-31 with a boot zone and a second memory 101-32 with a data zone.

First, the present invention will be described with respect to the flash memory 101-3, with a boot zone and a data zone, and an apparatus and method for protecting the same.

The PC 100 and the ATAPI drive 101 communicate with each other using an ATAPI protocol, and a firmware program downloaded from the PC 100 is stored in the flash memory 101-3 via an RAM 101-2. The flash memory 101-3 includes first and second boot zones, where booting programs are stored, and the data zone, where the the firmware program downloaded from the PC 100 is stored.

FIG. 2A illustrates the flash memory 101-3 with the boot zone and the data zone of different addresses, according to an embodiment of the present invention. The boot zone includes a first boot zone and a second boot zone. The first boot zone stores the booting program and the second boot zone stores a backup of the booting program stored in the first boot zone. If an error is detected in either the first or second boot zone, of the flash memory 101-3, the booting program stored in the alternative first or second boot zone, having no error, is executed.

A flash memory protection apparatus according to an embodiment of the present invention will now be described with reference to FIGS. 1 and 2A.

When the ATAPI drive 101 is initialized, the controller 101-1 accesses the first and second boot zones and detects for an error therein and correspondingly executes the booting program stored in the non-error resident first or second boot zone.

Next, the controller 101-1 executes the booting program stored in the corresponding non-error resident first or second boot zone.

When an error is not detected in the first boot zone, the controller 101-1 detects and corrects for an error in the second boot zone, while executing the booting program in the first boot zone. The detection and correction of the error in the second boot zone are performed using data stored in the first boot zone, which has no error. That is, since no error is detected in the first boot zone, the booting program in the first boot zone is stored in the second boot zone, replacing the second boot zone booting program. If the booting program is executed, the controller 101-1 executes the firmware program in the data zone and then operates the ATAPI drive 101.

When an error is detected in the first boot zone, the controller 101-1 checks for the presence of an error in the second boot zone. If no error is detected in the second boot zone, an error in the first boot zone is corrected, while executing the backup of the booting program stored in the second boot zone. The detection and correction of the error in the first boot zone are performed using data stored in the second boot zone, which has no error. That is, since no error is detected in the second boot zone, the booting program stored in the second boot zone is stored in the first boot zone, replacing the first boot zone booting program. If the booting program is executed, the controller 101-1 executes the firmware program in the data zone and then operates the ATAPI drive 101.

The controller 101-1 individually includes a switching unit (not shown) and thus is capable of switching the second boot zone on, to jump directly to the second boot zone during the initialization of the ATAPI drive 101.

A flash memory protection method according to another embodiment of the present invention will now be described with reference to FIGS. 2A and 3.

If the ATAPI 101 is initialized, the controller 101-1 accesses the flash memory 101-3 (operation 300).

Next, the controller 101-1 detects for an error in the first and second boot zones of the flash memory 101-3 (operation 301).

If no error is detected in the first boot zone (operation 302), the controller 101-1 detects and corrects for an error in the second boot zone while executing the booting program in the first boot zone (operation 303). The detection and correction of the error in the second boot zone are performed based on data stored in the first boot zone. That is, since no error is detected in the first boot zone, the booting program in the first boot zone is stored in the second boot zone, replacing the second boot zone booting program.

If an error is detected in the first boot zone (operation 302), the controller 101-1 determines whether an error is also detected in the second boot zone (operation 304). If the error is detected in the first boot zone, the operation of the ATAPI drive 101 is stopped. Then, the controller 101-1 jumps to the second boot zone containing the backup of the booting program, and detects for an error in the second boot zone.

If no error is detected in the second boot zone, the controller 101-1 executes the backup of the booting program in the second boot zone and corrects the error in the first boot zone (operation 305). The detection and correction of the error in the first boot zone is based on data stored in the second boot zone, which has no error. That is, since no error is detected in the second boot zone, the backup booting program in the second boot zone is stored in the first boot zone, replacing the first boot zone booting program.

After the execution of the booting program, the controller 101-1 executes the firmware program in the data zone of the flash memory 101-3 and operates the ATAPI drive 101 (operation 306).

Secondly, the present invention will be described with respect to the flash memory 101-3, having a first memory 101-31 with a boot zone, and a second memory 101-32 with a data zone, and an apparatus and method for protecting the same.

The PC 100 and the ATAPI drive 101 communicate with each other using an ATAPI protocol, with a firmware program downloaded from the PC 100 being stored in the flash memory 101-3 via the RAM 101-2. The flash memory 101-3 is divided into the first memory 101-31 with first and second boot zones, where booting programs are stored, and the second memory 101-32, with a data zone where the firmware program downloaded from the PC 100 is stored.

FIG. 2B illustrates the flash memory 101-3 having the first memory 101-31 with the boot zone, and the second memory 101-32 with the data zone, according to another embodiment of the present invention. Here, boot zone of the first memory 101-31 includes the first and second boot zones. The first boot zone stores a booting program and the second boot zone stores a backup of the booting program stored in the first boot zone. If an error is detected in the first or second boot zones of the first memory 101-31, the booting program stored in the alternate first or second boot zone, having no error, is executed.

A flash memory protection apparatus according to an embodiment of present invention will now be described with reference to FIGS. 1 and 2B.

When the ATAPI drive 101 is initialized, the controller 101-1 accesses the first and second boot zones of the first memory 101-31, of the flash memory 101-3, and detects for an error in the first and second boot zones, so as to execute the booting program.

The controller 101-1 executes the booting program in whichever of the first or second boot zones is errorless.

More specifically, if no error is detected in the first boot zone, the controller 101-1 detects and corrects for an error in the second boot zone while executing the booting program stored in the first boot zone. The detection and correction of the error in the second boot zone is based on data in the first boot zone, which has no error. That is, since no error is detected in the first boot zone, the booting program in the first boot zone is stored in the second boot zone. When the booting program is executed, the controller 101-1 executes the firmware program in the data zone, i.e., the second memory 101-32, and then operates the ATAPI drive 101.

If an error is detected in the first boot zone, the controller 101-1 detects for an error in the second boot zone. If no error is detected in the second boot zone, the error in the first boot zone is corrected for, while executing the backup of the booting program stored in the second boot zone. The detection and correction of the error in the first boot zone is based on data in the second boot zone, which has no error. That is, since no error is detected in the second boot zone, the backup of the booting program in the second boot zone is stored in the first boot zone. Then controller 101-1 executes the firmware program in the data zone, i.e., second memory 101-32, and then operates the ATAPI drive 101.

The controller 101-1 individually includes a switching unit (not shown) and thus is capable of switching the boot zone of the first memory 101-31 from the first boot zone to jump to the second boot zone, during the initialization of the ATAPI drive 101.

A flash memory protection method will now be described with reference to FIGS. 2B and 4.

When the ATAPI drive 101 is initialized, the controller 101-1 accesses the first memory 101-31 of the flash memory 101-3 (operation 400).

Next, the controller 101-1 detects for an error in the first and second boot zones of the first memory 101-31, of the flash memory 101-3 (operation 401).

If no error is detected in the first boot zone (operation 402), the controller 101-1 detects and corrects for an error in the second boot zone while executing the booting program in the first boot zone (operation 403). The detection and correction of the error in the second boot zone is based on data in the first boot zone, which has no error. That is, since no error is detected in the first boot zone, the booting program in the first boot zone is stored in the second boot zone, replacing the second boot zone booting program.

If an error is detected in the first boot zone (operation 402), the controller 101-1 determines whether an error is detected in the second boot zone (operation 404). When an error is detected in the first boot zone, the operation of the ATAPI drive 101 is stopped. Then, the controller 101-1 jumps to the second boot zone, containing the backup of the booting program, and detects for an error in the second boot zone.

If no error is detected in the second boot zone, the controller 101-1 executes the backup of the booting program in the second boot zone and corrects for the error in the first boot zone (operation 405). The detection and correction of the error in the first boot zone is based on data in the second boot zone, which has no error. That is, since no error is detected in the second boot zone, the booting program in the second boot zone is stored in the first boot zone, replacing the first boot zone booting program.

After the execution of the booting program, the controller 101-1 executes the firmware program stored in the second memory 101-32, of the flash memory 101-3 (operation 406).

After the execution of the firmware program, the controller 101-1 operates the ATAPI drive 101 (operation 407).

As described above, according to embodiments of the present invention, it is possible to restore a flash memory damaged due to some external cause, to its original state, thereby reducing costs for replacement of the damaged flash memory.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flash memory, comprising:
   a first boot zone storing a first booting program;
   a second boot zone storing a duplicate of the first booting program, as a second booting program; and
   a data zone storing an executable firmware program executable and accessible based on selectable booting of the first or second booting programs when executed after execution of the first or second booting programs such that execution of the first booting program is selectively commenced by a controller based on error detection results of the first boot zone and such that execution of the second booting program is selectively commenced by the controller based upon an error being detected in the first boot zone and on error detection results of the second boot zone,
   wherein the flash memory is operable after the selectable booting of the first and second booting programs and upon execution of the firmware program.

2. A memory protection apparatus, of an AT Attachment Packet Interface (ATAPI) drive for storing an executable firmware program, downloaded from a host, the apparatus comprising:
   a storage unit having a first boot zone storing a first booting program, a second boot zone storing a duplicate of the first booting program, as a second booting program, and a data zone storing the firmware program; and
   a controller checking for a presence of an error in the first and/or second booting zones when the ATAPI drive is initialized, commencing execution of the first booting program based on error detection results of the first boot zone, commencing execution of the second booting program based upon an error being detected in the first boot zone and on error detection results of the second boot zone, and controlling execution of the firmware program,
   wherein the ATAPI drive is operable after selectable booting of the first and second booting programs and upon execution of the firmware program.

3. A memory protection apparatus, of an AT Attachment Packet Interface (ATAPI) drive for storing an executable firmware program, downloaded from a host, the apparatus comprising:
   a storage unit having a first boot zone storing a first booting program, a second boot zone storing a duplicate of the first booting program, as a second booting program, and a data zone storing the firmware program; and
   a controller checking for a presence of an error in the first and/or second booting zones when the ATAPI drive is initialized, commencing execution of the first booting program based on error detection results of the first boot zone, commencing execution of the second booting program based upon an error being detected in the first boot zone and on error detection results of the second boot zone, and controlling execution of the firmware program,
   wherein the controller detects and corrects for an error in the second boot zone while executing the first booting program, when no error is detected in the first boot zone.

4. A memory protection apparatus, of an AT Attachment Packet Interface (ATAPI) drive for storing an executable firmware program, downloaded from a host, the apparatus comprising:
   a storage unit having a first boot zone storing a first booting program, a second boot zone storing a duplicate of the first booting program, as a second booting program, and a data zone storing the firmware program; and
   a controller checking for a presence of an error in the first and/or second booting zones when the ATAPI drive is initialized, commencing execution of the first booting program based on error detection results of the first boot zone, commencing execution of the second booting program based upon an error being detected in the first boot zone and on error detection results of the second boot zone, and controlling execution of the firmware program,
   wherein the controller detects and corrects for an error in the second boot zone while executing the first booting program, when no error is detected in the first boot zone, and wherein data stored in the first boot zone, which has no error, is used as a basis for the detection and correction of the error in the second boot zone.

5. The apparatus of claim 2, wherein the controller corrects for an error in the first boot zone while executing the second booting program, when the error is detected in the first boot zone.

6. A memory protection apparatus, of an AT Attachment Packet Interface (ATAPI) drive for storing an executable firmware program, downloaded from a host, the apparatus comprising:
a storage unit having a first boot zone storing a first booting program, a second boot zone storing a duplicate of the first booting program, as a second booting program, and a data zone storing the firmware program; and
a controller checking for a presence of an error in the first and/or second booting zones when the ATAPI drive is initialized, commencing execution of the first booting program based on error detection results of the first boot zone, commencing execution of the second booting program based upon an error being detected in the first boot zone and on error detection results of the second boot zone, and controlling execution of the firmware program,
wherein the controller corrects for an error in the first boot zone while executing the second booting program, when the error is detected in the first boot zone, and
wherein data in the second boot zone, which has no error, is used as a basis for the correction of the error in the first boot zone.

7. A memory protection apparatus, of an AT Attachment Packet Interface (ATAPI) drive for storing an executable firmware program, downloaded from a host, the apparatus comprising:
a storage unit having a first boot zone storing a first booting program, a second boot zone storing a duplicate of the first booting program, as a second booting program, and a data zone storing the firmware program; and
a controller checking for a presence of an error in the first and/or second booting zones when the ATAPI drive is initialized, commencing execution of the first booting program based on error detection results of the first boot zone, commencing execution of the second booting program based upon an error being detected in the first boot zone and on error detection results of the second boot zone, and controlling execution of the firmware program,
wherein the controller further comprises a switching unit switching the second boot zone on, so as to jump to the second boot zone during the initialization of the ATAPI drive to execute the second booting program,
wherein the ATAPI drive is operable after selectable booting of the first and second booting programs and upon execution of the firmware program.

8. The apparatus of claim 2, wherein the host is a computer and the ATAPI drive and the computer communicate using an ATAPI protocol.

9. A method of operating an ATAPI drive for storing an executable firmware program downloaded from a host, the method comprising:
detecting for an error in a first boot zone of a memory, storing a first booting program, and a second boot zone of the memory, storing a duplicate of the first booting program, as a second booting program, when the ATAPI drive is initialized;
commencing executing of the first booting programs based on error detection results of the first boot zone;
commencing executing of the second booting programs based upon an error being detected in the first boot zone and on error detection results of the second boot zone; and
accessing the data zone of the memory in which the firmware program is stored and executing the firmware program after the executed first or second booting programs,
wherein the ATAPI drive is operable after selectable booting of the first and second booting programs and upon execution of the firmware program.

10. A method of operating an ATAPI drive for storing an executable firmware program downloaded from a host, the method comprising:
detecting for an error in a first boot zone of a memory, storing a first booting program, and a second boot zone of the memory, storing a duplicate of the first booting program, as a second booting program, when the ATAPI drive is initialized;
commencing executing of the first booting programs based on error detection results of the first boot zone;
commencing executing of the second booting programs based upon an error being detected in the first boot zone and on error detection results of the second boot zone; and
accessing the data zone of the memory in which the firmware program is stored and executing the firmware program after the executed first or second booting programs,
wherein during the executing of the first booting program, an error in the second boot zone is corrected for, while executing the first booting program in the first boot zone, which has no error.

11. A method of operating an ATAPI drive for storing an executable firmware program downloaded from a host, the method comprising:
detecting for an error in a first boot zone of a memory, storing a first booting program, and a second boot zone of the memory, storing a duplicate of the first booting program, as a second booting program, when the ATAPI drive is initialized;
executing one of the first and second booting programs based on whether the first boot zone or the second boot zone includes an error; and
accessing the data zone of the memory in which the firmware program is stored and executing the firmware program after the executed one booting program,
wherein during the executing of the one booting program, an error in the second boot zone is corrected for, while executing the first booting program in the first boot zone, which has no error, and
wherein data in the first boot zone, which has no error, is used as a basis for the detection and correction of the error in the second boot zone.

12. The method of claim 9, during the executing of the second booting program, an error in the first boot zone is corrected for, while executing the second booting program in the second boot zone, which has no error.

13. A method of operating an ATAPI drive for storing an executable firmware program downloaded from a host, the method comprising:
detecting for an error in a first boot zone of a memory, storing a first booting program, and a second boot zone of the memory, storing a duplicate of the first booting program, as a second booting program, when the ATAPI drive is initialized:

commencing executing of the first booting programs based on error detection results of the first boot zone;

commencing executing of the second booting programs based upon an error being detected in the first boot zone and on error detection results of the second boot zone; and accessing the data zone of the memory in which the firmware program is stored and executing the firmware program after the executed first or second booting programs, wherein, during the executing of the second booting program, an error in the first boot zone is corrected for, while executing the second booting program in the second boot zone, which has no error, and wherein data in the second boot zone, which has no error is used as a basis for the detection and correction of the error in the first boot zone.

14. The method of claim 9, further comprising communicating between the host, which is a computer, and the ATAPI drive using an ATAPI protocol.

15. A flash memory, comprising:

a first memory having a first boot zone storing a first booting program and a second boot zone storing a duplicate of the first booting program, as a second booting program; and a second memory having a data zone storing an executable downloaded firmware program executable and accessible based on selectable booting of the first or second booting programs when executed after execution of the first or second booting programs, such that execution of the first booting program is selectively commenced by a controller based on error detection results of the first boot zone and such that execution of the second booting program is selectively commenced by the controller based upon an error being detected in the first boot zone and on error detection results of the second boot zone, wherein the flash memory is operable after selectable booting of the first and second booting programs and upon execution of the firmware program.

16. The flash memory of claim 15, wherein the firmware program is downloadable from a computer using an ATAPI protocol.

17. A memory protection apparatus, including an ATAPI drive for storing an executable firmware program downloaded from a host, the apparatus comprising:

a first storage unit having a first boot zone storing a first booting program and a second boot zone storing a duplicate of the first booting program, as a second booting program;

a second storage unit storing the firmware program; and a controller detecting for an error in one of the first and second boot zones when the ATAPI drive is initialized, commencing execution of the first booting program or the second booting program, respectively, based on respective error detection results of the first and second boot zones, and controlling execution of the firmware program stored in the data zone of the second storage unit, wherein the ATAPI drive is operable after selectable booting of the first and second booting programs and upon execution of the firmware program.

18. A memory protection apparatus, including an ATAPI drive for storing an executable firmware program downloaded from a host, the apparatus comprising:

a first storage unit having a first boot zone storing a first booting program and a second boot zone storing a duplicate of the first booting program, as a second booting program;

a second storage unit storing the firmware program; and a controller detecting for an error in one of the first and second boot zones when the ATAPI drive is initialized, commencing execution of the first booting program or the second booting program, respectively, based on respective error detection results of the first and second boot zones, and controlling execution of the firmware program stored in the data zone of the second storage unit, wherein the controller detects and corrects for an error in the second boot zone while executing the booting program in the first boot zone, when no error is detected in the first boot zone.

19. A memory protection apparatus, including an ATAPI drive for storing an executable firmware program downloaded from a host, the apparatus comprising:

a first storage unit having a first boot zone storing a first booting program and a second boot zone storing a duplicate of the first booting program, as a second booting program;

a second storage unit storing the firmware program; and a controller detecting for an error in one of the first and second boot zones when the ATAPI drive is initialized, executing the first booting program or the second booting program based on whether the one boot zone is the first boot zone or the second boot zone, and controlling execution of the firmware program stored in the data zone of the second storage unit, wherein the controller detects and corrects for an error in the second boot zone while executing the booting program in the first boot zone, when no error is detected in the first boot zone, wherein data in the first boot zone, which has no error, is used as a basis for the detection and correction of the error in the second boot zone.

20. The apparatus of claim 17, wherein the controller corrects for an error in the first boot zone while executing the second booting program in the second boot zone, when the error is detected in the first boot zone.

21. A memory protection apparatus, including an ATAPI drive for storing an executable firmware program downloaded from a host, the apparatus comprising:

a first storage unit having a first boot zone storing a first booting program and a second boot zone storing a duplicate of the first booting program, as a second booting program;

a second storage unit storing the firmware program; and a controller detecting for an error in one of the first and second boot zones when the ATAPI drive is initialized, commencing execution of the first booting program or the second booting program, respectively, based on respective error detection results of the first and second boot zones, and controlling execution of the firmware program stored in the data zone of the second storage unit, wherein the controller corrects for an error in the first boot zone while executing the second booting program in the second boot zone, when the error is detected in the first boot zone, wherein data in the second boot zone, which has no error, is used as a basis for the correction of the error in the first boot zone.

22. A memory protection apparatus, including an ATAPI drive for storing an executable firmware program downloaded from a host, the apparatus comprising:
a first storage unit having a first boot zone storing a first booting program and a second boot zone storing a duplicate of the first booting program, as a second booting program;
a second storage unit storing the firmware program; and
a controller detecting for an error in one of the first and second boot zones when the ATAPI drive is initialized, executing the first booting program or the second booting program based on whether the one boot zone is the first boot zone or the second boot zone, and controlling execution of the firmware program stored in the data zone of the second storage unit,
wherein the controller further comprises a switching unit switching the second boot zone on, so as to jump to the second boot zone, during the initialization of the ATAPI drive, to execute the second booting program,
wherein the ATAPI drive is operable after selectable booting of the first and second booting programs and upon execution of the firmware program.

23. The apparatus of claim 17, further comprising a computer, as the host, with the ATAPI drive and the computer communicating using an ATAPI protocol.

24. A method of operating an ATAPI drive, storing an executable firmware program downloaded from a host, the method comprising:
detecting for an error in first and second boot zones of a first storage unit when the ATAPI drive is initialized, the first boot zone storing a first booting program and the second boot zone storing a duplicate of the first booting program, as a second booting program;
commencing execution of the first booting program based on error detection results of the first boot zone;
commencing execution of the second booting program based upon an error being detected in the first boot zone and on error detection results of the second boot zone; and
accessing a data zone of a second storage unit, storing the firmware program, and executing the firmware program after the execution of the first or second booting programs,
wherein the ATAPI drive is operable after selectable booting of the first and second booting programs and upon execution of the firmware program.

25. A method of operating an ATAPI drive, storing an executable firmware program downloaded from a host, the method comprising:
detecting for an error in first and second boot zones of a first storage unit when the ATAPI drive is initialized, the first boot zone storing a first booting program and the second boot zone storing a duplicate of the first booting program, as a second booting program:
commencing execution of the first booting program based on error detection results of the first boot zone;
commencing execution of the second booting program based upon an error being detected in the first boot zone and on error detection results of the second boot zone; and
accessing a data zone of a second storage unit, storing the firmware program, and executing the firmware program after the execution of the first or second booting programs,
wherein during the executing of the first booting program, an error in the second boot zone is corrected for, while executing the first booting program, which has no error.

26. A method of operating an ATAPI drive, storing an executable firmware program downloaded from a host, the method comprising:
detecting for an error in first and second boot zones of a first storage unit when the ATAPI drive is initialized, the first boot zone storing a first booting program and the second boot zone storing a duplicate of the first booting program, as a second booting program;
executing one of the first and second booting programs based on whether the corresponding first or second boot zone has no error; and
accessing a data zone of a second storage unit, storing the firmware program, and executing the firmware program after the execution of the one booting program,
wherein during the executing of the one booting program, an error in the second boot zone is corrected for, while executing the first booting program, which has no error, and
wherein data in the first boot zone, which has no error, is used as a basis for the detection and correction of an error in the second boot zone.

27. The method of claim 24, wherein during the executing of the second booting program, an error in the first boot area is corrected for, while executing the second booting program, which has no error.

28. A method of operating an ATAPI drive, storing an executable firmware program downloaded from a host, the method comprising:
detecting for an error in first and second boot zones of a first storage unit when the ATAPI drive is initialized, the first boot zone storing a first booting program and the second boot zone storing a duplicate of the first booting program, as a second booting program;
commencing execution of the first booting program based on error detection results of the first boot zone;
commencing execution of the second booting program based upon an error being detected in the first boot zone and on error detection results of the second boot zone; and
accessing a data zone of a second storage unit, storing the firmware program, and executing the firmware program after the execution of the first or second booting programs,
wherein during the executing of the second booting program, an error in the first boot area is corrected for, while executing the second booting program, which has no error, and
wherein data in the second boot zone, which has no error, is used as a basis for the correction of the error in the first boot zone.

29. The method of claim 24, wherein the host is a computer and the ATAPI drive and the computer communicate using an ATAPI protocol.

30. A storage system, comprising:
a first memory storing more than one booting program;
a second memory storing a firmware program for the storage system, separately addressable from the first memory; and
a controller checking for a presence of an error in a first memory portion, of the first memory, when a storage drive containing the first memory is initialized, commencing execution of a first booting program, stored in the first memory portion, upon no error being detected in the first memory portion, and commencing execution of a different booting program stored in a different memory portion of the first memory, upon the error being detected in the first memory portion, and executing the firmware program after executing a booting programs wherein the storage system is operable after selectable booting of the first and second booting programs and upon execution of the firmware program.

31. A storage system, comprising:

a first memory storing more than one booting program;

a second memory storing a firmware program for the storage system, separately addressable from the first memory; and a controller checking for a presence of an error in a first memory portion, of the first memory, when a storage drive containing the first memory is initialized, commencing execution of a first booting program, stored in the first memory portion, upon no error being detected in the first memory portion, and commencing execution of a different booting program stored in a different memory portion of the first memory, upon the error being detected in the first memory portion, and executing the firmware program after executing a booting program, wherein the first memory is divided into separately addressable memory portions, including the first memory portion, with at least two memory portions including booting programs.

32. The storage system of claim 30, wherein the controller detects and corrects for an error in a second memory portion while executing the first booting program, when no error is detected in the first boot zone.

33. A storage system, comprising:

a first memory storing more than one booting program;

a second memory storing a firmware program for the storage system, separately addressable from the first memory; and a controller checking for a presence of an error in a first memory portion, of the first memory, when a storage drive containing the first memory is initialized, executing a first booting program, stored in the first memory portion, if no error is detected in the first memory portion, and executing a different booting program stored in a different memory portion of the first memory, if the error is detected in the first memory portion, and executing the firmware program after executing a booting program, wherein the controller detects and corrects for an error in a second memory portion while executing the first booting program, when no error is detected in the first boot zone, and wherein data stored in the first memory portion, which has no error, is used as a basis for the detection and correction of the error in the second memory portion.

34. The storage system of claim 33, wherein a booting program of the second memory portion is replaced by the first booting program during the correction of the error in the second memory portion.

35. The storage system of claim 30, wherein the controller detects and corrects for an error in the first memory portion while executing a second booting program from a second memory portion, when no error is detected in the second memory portion.

36. The storage system of claim 35, wherein data stored in the second memory portion, which has no error, is used as a basis for the correction of the error in the first memory portion.

37. A storage system, comprising:

a first memory storing more than one booting program;

a second memory storing a firmware program for the storage system, separately addressable from the first memory; and a controller checking for a presence of an error in a first memory portion, of the first memory, when a storage drive containing the first memory is initialized, commencing execution of a first booting program, stored in the first memory portion, upon no error being detected in the first memory portion, and commencing execution of a different booting program stored in a different memory portion of the first memory, upon the error being detected in the first memory portion, and executing the firmware program after executing a booting program, wherein the controller detects and corrects for an error in the first memory portion while executing a second booting program from a second memory portion, when no error is detected in the second memory portion, wherein data stored in the second memory portion, which has no error, is used as a basis for the correction of the error in the first memory portion, and wherein the first booting program of the first memory portion is replaced by the second booting program during the correction of the error in the first memory portion.

38. The storage system of claim 30, further comprising a host communicating to the second memory to store the firmware in the second memory.

39. The storage system of claim 38, wherein the first and second memories are in an AT Attachment Packet Interface (ATAPI) drive and the host is a computer communicating with the ATAPI drive using an ATAPI protocol.

* * * * *

UNITED STATES PATENT AND TRADEMARK OFFICE
CERTIFICATE OF CORRECTION

| | |
|---|---|
| PATENT NO. | : 7,334,121 B2 |
| APPLICATION NO. | : 10/720078 |
| DATED | : February 19, 2008 |
| INVENTOR(S) | : Ki-Ju Lee |

Page 1 of 1

It is certified that error appears in the above-identified patent and that said Letters Patent is hereby corrected as shown below:

Title Page, Column 2 (Assistant Examiner), Line 1, change "Malcom" to --Malcolm--.

Column 11, Line 3, change "initialized:" to --initialized;--.

Column 13, Line 57, change "program:" to --program;--.

Column 15, Line 5, change "programs" to --program,--.

Signed and Sealed this

Twenty-second Day of July, 2008

JON W. DUDAS
*Director of the United States Patent and Trademark Office*